Oct. 7, 1969 M. J. PALLADINO 3,471,636

CONSTANT PHASE CHROMINANCE COUPLING NETWORK

Filed May 2, 1966

INVENTOR:
MICHAEL J. PALLADINO,
BY Donald M. Timlie
HIS ATTORNEY.

United States Patent Office 3,471,636

Patented Oct. 7, 1969

3,471,636

CONSTANT PHASE CHROMINANCE COUPLING NETWORK

Michael J. Palladino, North Syracuse, N.Y., assignor to General Electric Company, a corporation of New York Filed May 2, 1966, Ser. No. 546,649
Int. Cl. H04n 5/38, 5/44
U.S. Cl. 178—5.4 6 Claims

ABSTRACT OF THE DISCLOSURE

A compensation network is used to compensate for the high frequency "roll off" of the video amplifier used in a color television receiver. The network, which has a constant resistance and constant phase transfer characteristic, couples the output of the video amplifier to the input of the synchronous demodulators.

Figures 1, 2, 3, 4, 5:
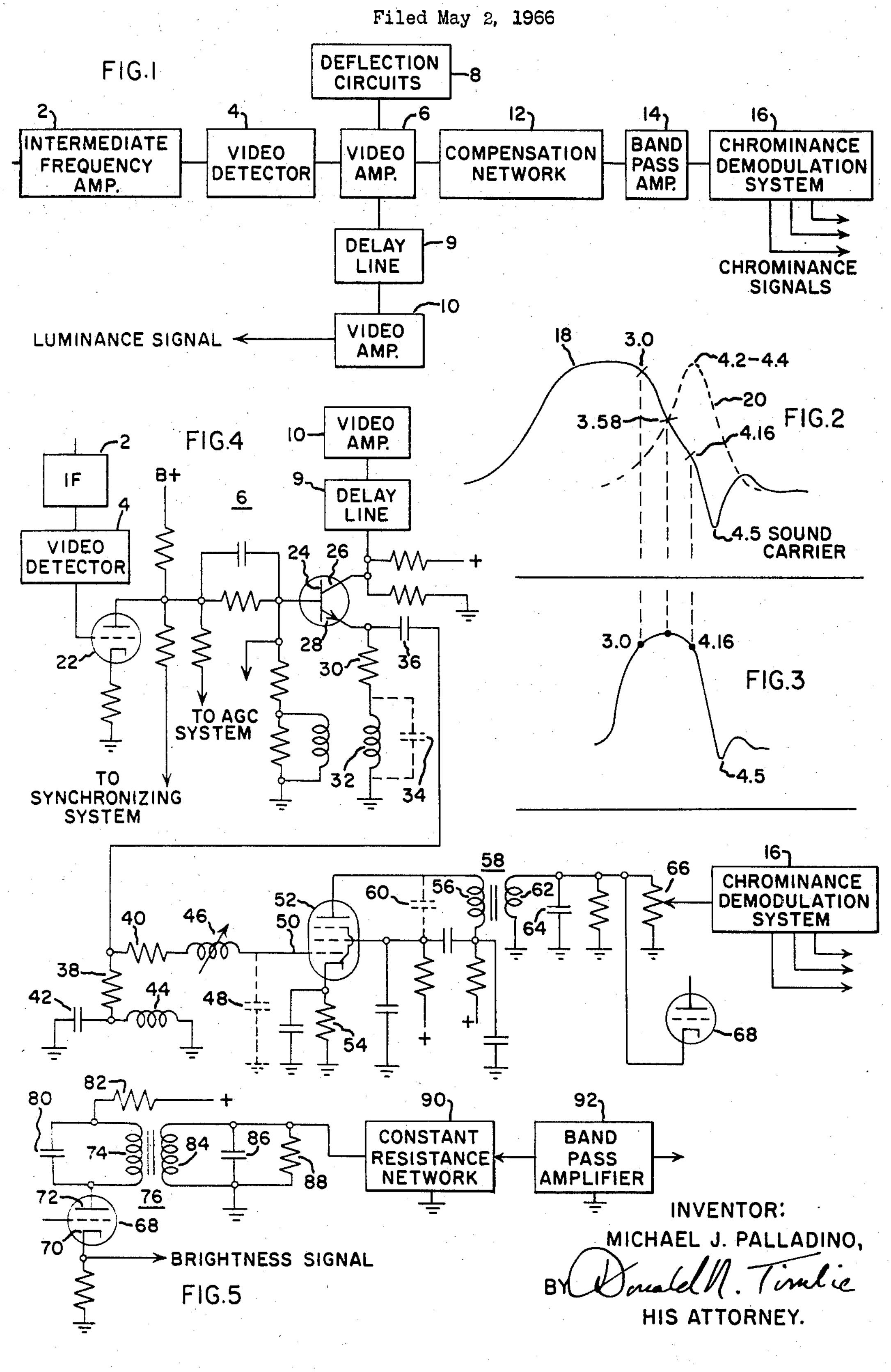

This invention relates to a network for compensating the frequency response characteristic of the intermediate frequency amplifier of a color television receiver in such manner as to minimize the phase distortion that is otherwise produced in the color signals.

In the N.T.S.C. standards, the chroma signals appear in the upper portion of the video signal spectrum between 3 and 4.16 megacycles. They are in the form of sidebands resulting from amplitude and phase modulation of a suppressed carrier wave of about 3.58 megacycles. In most color television receivers the frequency response of the intermediate frequency amplifier falls off rather rapidly for intermediate frequencies representing the chroma signals with the result that the lower frequency chroma signals are supplied to the chrominance detection circuits with a greater amplitude than the higher frequencies. Furthermore, due to amplitude compensation networks presently in use the phase relationship of the chroma signals is distorted so that the colors derived by the chrominance detector are not correct. However, it is possible to design a color television receiver in which the frequency response of the intermediate frequency amplifier is substantially flat within the range of frequencies representing the chroma signals. In such event distortion of the chroma signals will result unless they are coupled to the chrominance detection circuits via a network that does not disturb the phase relationships.

In most color television receivers, the entire video signal is applied to a channel which controls the brightness of the image and the portion of the video signal containing the color information is applied to a chrominance channel. In order to reduce the adverse effect of the color signals on the brightness channel, it is customary to provide a circuit for trapping out or removing 3.58 megacycles.

Accordingly, it is an object of this invention to provide a network in the color channel that compensates for the amplitude distortion of the color signal produced by the intermediate frequency amplifier in such a way as to preserve proper phase relationships in the color signal.

It is another object of the invention to provide a network that, in addition to meeting the objective stated above, attenuates the color signal, or portions thereof, appearing in the brightness channel.

It is another object of the invention to provide an amplitude compensation network that operates in such manner as to present a substantially constant resistance at its input side.

It is another object of the invention to provide a minimum phase shift network for amplitude compensation purposes.

It is another object of this invention to provide a minimum phase shift coupling in a color receiver for the chrominance detection system.

In accordance with the principles of this invention, these objectives may be attained by inserting between the intermediate frequency amplifier and the chrominance detection circuits a constant resistance network having an amplitude vs. frequency response that is reciprocal to that of the intermediate frequency amplifier in the vicinity of the chroma signals. The amount of chroma signals appearing in the brightness channel can be attenuated by coupling one output electrode of a video amplifier to the brightness channel and another to the chrominance channel, and connecting the latter output electrode to ground via a circuit exhibiting parallel resonance for the frequencies of the chroma signal.

The particular constant resistance network illustrated in this specification is comprised of a branch containing a parallel resonant circuit connected in parallel with a branch containing a series resonant circuit. The input is connected across both branches, and the output is taken across one of the reactive impedances of the series branch. The parallel and series circuits are each resonant at a frequency just above that of the highest chroma signal and each branch is made to have approximately equal and appropriate Q's by the insertion of sufficient resistance.

The manner in which the above objectives are achieved in accordance with the principles of this invention will be more clearly understood after the detailed discussion of the drawings in which:

FIGURE 1 is a block diagram of a portion of a color television receiver to which the invention applies, FIGURE 2 illustrates the frequency responses of the typical intermediate frequency amplifier and of the network of this invention, FIGURE 3 illustrates the frequency response of the intermediate frequency amplifier and the network, FIGURE 4 illustrates schematically one form of circuit embodying this invention, and FIGURE 5 illustrates schematically another form of a circuit embodying this invention.

Reference is now made to FIGURE 1 wherein an intermediate frequency amplifier 2 is connected to a second detector 4. A first video amplifier 6 has its input connected to the second detector 4, and its output connected to deflection circuit 8, a luminance channel video amplifier 10, and to the compensation network 12 of this invention. A color signal amplifier 14 is connected between the compensation network 12 and a color signal demodulation system 16.

In FIGURE 2, the curve 18 represents the typical frequency response characteristic of a color television receiver at the output of a second detector, and the curve 20 illustrates the frequency response characteristic of the constant resistance compensation network 12. The drop in response in the vicinity of 3.58 megacycles is primarily the result of the frequency characteristic of the intermediate frequency amplifier. The slopes of the curves 18 and 20 are seen to be approximately in reciprocal relationship in the range of video frequencies in which the chroma signal appears. Because of this, the frequency response of the intermediate frequency amplifier and compensating network combined is approximately flat for the frequency range of the color signals as indicated by the curve of FIGURE 3. This means that the amplitudes of the upper and lower sidebands of the 3.58 megacycle suppressed subcarrier wave will have nearly equal amplitude and minimum phase difference due to the constant resistance of the compensation network, and thus the chrominance signals derived therefrom by the chrominance demodulator system 16 will be substantially free of the distortion that would otherwise result. It is to be noted that the response of the receiver prior to the point where the chroma signals are applied to the chroma channel, as illustrated by the curve 18, is shown as being the same as the response of the constant resistance coupling network, curve 20, at the frequency of the subcarrier. This is not essential, but it will be found that in most designs that the responses are not far apart simply because the peak of the curve 20 is close to the highest chroma signal frequency of 4.16 megacycles and has a reciprocal slope.

FIGURE 4 illustrates one form of circuit for performing the functions just described. Parts which are common to FIGURE 1 are designated by the same numerals. The intermediate frequency signals supplied by the intermediate frequency amplifier 2 are detected by the video detector 4 and applied to a video amplifier 6, which in this particular circuit, is composed of three stages, a triode 22, a transistor 24, and an output stage 10. One output electrode of the transistor 24, in this particular circuit, the collector 26, is coupled via the delay line 9 to the video amplifier 10. The transistor 24 matches the relatively high impedance of the triode 22 to the generally low impedance of the delay line 9. Its other output electrode, in this case an emitter 28, provides signals to the chrominance demodulation system 16 via the compensation network which will now be described in detail. The emitter 28 is connected to ground via a load resistor 30 and an inductance 32, the latter having a distributed capacitance 34, shown in dotted lines, of such value as to make the coil exhibit a broad parallel resonance at the subcarrier frequency of 3.58 megacycles. This absorption of energy reduces the amount of 3.58 megacycle current at the collector 26, and thereby eliminates the need for special trap circuits.

A coupling capacitor 36 is connected between emitter 28 and the junction of resistors 38, 40. The resistor 38 is connected in series with a parallel circuit comprised of a capacitor 42 and inductance 44. This parallel circuit 42, 44 is preferably resonant at some frequency just above the highest color signal frequency of 4.16 megacycles, such as 4.2 megacycles. It is advisable that it be as close to 4.16 megacycles as possible in order that the response of the entire network to the sound carrier of 4.5 megacycles may be at a minimum.

The resistor 40 is connected to a series circuit that is also resonant at 4.2 megacycles, this series circuit being comprised of a variable tuning inductance 46 and the inherent capacitance to ground 48, shown in dotted lines, of the grid 50 of the band pass amplifier 52. Whether or not a physical capacitor is needed depends on the amount of the inherent capacitance.

The total resistance $R_t$ of both branches may be expressed as follows:

$$R_t=\frac{(R+R_p)(R+R)_s}{R+R_p+R+R_s}$$

R=the value of the resistor 38; thus is equal to the effective resistance 40.

$R_p$=the resistance of the parallel branch 42, 44.

$R_s$=the resistance of the series branch 46, 48.

From inspection it can be seen that $R_t$ will be constant as long as $R_p$ and $R_s$ vary by equal amounts in opposite directions.

This result is obtained if the values of the resistors 38, 40 are such as to make the Q's of the parallel branch 38, 42, 44 and the series branch 40, 46, 48 equal, as plots of their respective changes in resistance with frequency for such a condition will be mirror images of each other. It is to be understood that resistance may be contributed by elements of the circuit other than the resistors 38, 40, e.g. the coils 38, 40 and the grid circuit of the amplifier 52.

The absolute value of the complex impedance Z of the constant resistance network that is required can be calculated by those skilled in the art with the knowledge that the network is to have a peak response at 4.2 megacycles and an amplitude vs. frequency slope that is the reciprocal of the curve 18 in the range of the chroma signals.

The frequency response 20 of the coupling network may be explained as follows. At the frequency of resonance, here chosen as 4.2 megacycles, the parallel network 38, 42, 44 has its maximum value of complex impedance so that the current flowing in the parallel branch is a minimum. At this same frequency the complex impedance of the series circuit 40, 46, 48 is a minimum so as to permit the maximum current to flow therein and thus to produce the maximum voltage across the capacitance 48. On either side of resonance, i.e. 4.2 megacycles, the complex impedance of the parallel circuit 38, 42, 44 decreases, and the complex impedance of the series circuit 40, 46, 48 increases so that more current flows in the parallel branch and less in the series branch, thus decreasing the output voltage appearing across the capacitor 48.

The chroma amplifier 52 is biased, by a cathode resistor 54 for class A operation. Its output is produced across a primary winding 56 of a transformer 58 which is tuned to parallel resonance between 3.0 and 4.2 megacycles by inherent capacitance 60, shown in dotted lines. The secondary winding 62 is tuned to parallel resonance in the same range of frequencies by a capacitor 64. By overcoupling the windings 56 and 62, the output voltage appearing across the secondary winding 62 can, in accordance with well known principles, be made to dip in the vicinity of the center frequency by just enough to compensate for the slight peak at this frequency exhibited by the curve of FIGURE 3, thus making the overall response of the coupling network and the transformer 58 practically flat in the frequency range of the chroma signals.

As can be seen the voltage across the secondary winding 62 is coupled via a potentiometer 66 to the chrominance demodulator system 16. It is also coupled to a burst gate amplifier 68, the details of which are not shown.

Reference is now made to FIGURE 5 for the purpose of illustrating that the coupling network can be connected to a different output electrode, in this case the anode of an amplifier. The tube 68 is a video amplifier. The brightness signal is taken off at the cathode output electrode 70, and the chroma signal at the other output electrode, anode 72. A primary winding 74 of a transformer 76 is broadly tuned to resonance at the frequency of the color subcarrier 3.58 megacycles in the present N.T.S.C. system, by a suitable capacitor 80. Positive operating potential is supplied via a resistor 82. The secondary winding 84 of the transformer 76 is broadly tuned to resonance at the frequency of the color subcarrier by a capacitor 86, and resistor 88. A constant resistance network 90 is connected to the ungrounded end of the secondary winding 84, and its output is connected to a band pass amplifier 92. The details of the network 90 and the amplifier 92 are not shown, but can be the same as in FIGURE 4 from the junction of the resistors 38, 40 on.

In order to provide more detail in the image produced by a television set, the response of the brightness channel can be made relatively flat through the range of frequencies in which the chroma signal lies. In such a design a constant resistance network can be used for coupling the chrominance detection system to the chroma signal take-off point of the receiver in order to avoid phase distortion of the chroma signal. No amplitude compensation is necessary. In such a receiver, the schematic diagram would be the same as that shown in FIGURE 4 except that the parallel circuit 42, 44 and the series circuit 46, 48 would be designed to resonate at the color subcarrier frequency of 3.58 megacycles, and the Q's of the respective parallel and series branches would be adjusted to a lower value so as to provide a somewhat broader response than that exhibited by the curve 20 of FIGURE 2.

It is possible to provide attenuation of the chrominance signals in the luminance channel by means other than the parallel network 32, 34, in which case the coupling of the constant resistance network could be either D.C. or A.C. depending on bias and other considerations.

While the invention has been described in specific embodiments, it will be appreciated that many modifications may be made by those skilled in the art and we intend by the appended claims to cover all such modifications and changes as fall within the true spirit and scope of the invention.

What is claimed as new and desired to be secured by Letters Patent of the United States is:

1. In a color television receiver adapted to operate in response to a transmitted signal in which the color information is conveyed by sidebands of a modulated subcarrier, the sidebands being located in the upper region of the range of frequencies available for video signals, and wherein the frequency response of the receiver at the point where the chroma signals are to be supplied to the chrominance channel falls off in the said upper region, a chrominance demodulation system, a constant resistance coupling network coupled between said point and said chrominance demodulation system, said coupling network having a frequency response that is the reciprocal of that of the receiver up to that point, so as to produce a constant phase transfer characteristic and a more nearly uniform frequency response for the combination of the receiver and the network.

2. A color television receiver as set forth in claim 1 wherein said constant resistance coupling network is comprised of a parallel branch and a series branch connected in parallel from said point to ground, the parallel branch containing an inductance and capacitance connected in parallel and resonant at a frequency just above the highest frequency of the sidebands representing the color signals, the series branch containing an inductance and capacitance connected in series and series resonant at the same frequency, and means providing resistance in each of said branches of such value that the Q of each branch is the same.

3. A color television receiver adapted to operate in response to a transmitted signal in which the color information is conveyed by sidebands of a modulated subcarrier, the sidebands being located in the upper region of the range of frequencies available for video signals, and wherein the frequency response of the receiver at the point where the chroma signals are to be supplied to the chrominance channel falls off in the said upper region, a video amplifier having an input electrode and two output electrodes, means coupling said input electrode to said point, a parallel network resonant at the frequency of said subcarrier coupled between one of said output electrodes and ground, thereby reducing the amount of subcarrier frequency appearing at the other output electrode, a constant resistance network having an input and an output and having a frequency response transfer therebetween that is the reciprocal of that of the receiver up to the said point, means for alternating current coupling the input of said constant resistance network to said latter output electrode, said constant resistance network being comprised of a parallel branch and a series branch connected in parallel from said point to ground, the parallel branch containing an inductance and capacitance connected in parallel and resonant at a frequency just above the highest frequency of the sidebands representing the color signals, the series branch containing an inductance and capacitance connected in series and series resonant at the same frequency, and means providing resistance in each of said branches of such value that the Q of each branch is the same, the output of said constant resistance network being taken across either said inductance or capacitance of said series branch.

4. A color television receiver adapted to operate in response to a transmitted signal in which the color information is conveyed by sidebands of a modulated subcarrier, the sidebands being located in the upper region of the range of frequencies available for video signals, and wherein the frequency response of the receiver at the point where the chroma signals are to be supplied to the chrominance channel is substantially flat within the range of frequencies representing the chrominance signal, a chrominance demodulation system, a constant resistance coupling network coupled between said point and said chrominance demodullation system so as to provide a constant phase transfer characteristic, said coupling network having a frequency response that peaks at the frequency of said subcarrier.

5. A color television receiver as set forth in claim 4 wherein said constant resistance coupling network is comprised of a parallel branch and a series branch connected in parallel between said point and ground, the parallel branch containing an inductance and capcitance connected in parallel and resonant at the frequency of said subcarrier, and the series branch containing an inductance and capacitance connected in series and resonant at the same frequency.

6. A color television receiver adapted to operate in response to a transmitted signal in which the color information is conveyed by sidebands of a modulated subcarrier, the sidebands being located in the upper region of the range of frequencies available for video signals, and wherein the frequency response of the receiver at the point where the chroma signals are to be supplied to the chrominance channel is substantially flat within the range of frequencies representing the chrominance signal, a video amplifier having an input electrode and two output electrodes, means coupling said input electrode to said point, a parallel network resonant at the frequency of said subcarrier coupled between one of said output electrodes and ground, a constant resistance network having an input and an output, means for alternating current coupling the input of said constant resistance network to said output electrode, said constant resistance network being comprised of a parallel branch and a series branch connected in parallel from said point to ground, the parallel branch containing an inductance and capacitance connected in parallel and resonant at a frequency of said subcarrier, the series branch containing an inductance and capacitance connected in series and series resonant at the same frequency, and means providing resistance in each of said branches of such value that the Q of each branch is the same.

References Cited

UNITED STATES PATENTS

| | | | |
|---|---|---|---|
| 1,478,078 | 12/1923 | Wente | 333—28 X |
| 1,961,140 | 6/1934 | Farnham | 333—76 X |
| 2,138,996 | 12/1938 | Blumlein | 333—76 X |
| 2,577,868 | 12/1951 | Wissel | 333—28 X |
| 2,894,060 | 7/1959 | Squires | 178—5.4 |
| 2,989,581 | 6/1961 | Keizer | 178—5.4 |

RICHARD MURRAY, Primary Examiner

J. MARTIN, Assistant Examiner

U.S. Cl. X.R.

330—192; 333—28